United States Patent
Smirnov

(10) Patent No.: US 10,473,500 B2
(45) Date of Patent: Nov. 12, 2019

(54) SYSTEM AND METHOD FOR IMPROVED INDICATED FLOW IN MASS FLOW CONTROLLERS

(71) Applicant: Hitachi Metals, Ltd., Minato-Ku, Tokyo (JP)

(72) Inventor: Alexei V. Smirnov, Fort Collins, CO (US)

(73) Assignee: Hitachi Metals, Ltd., Tokyo (JP)

( * ) Notice: Subject to any disclaimer, the term of this patent is extended or adjusted under 35 U.S.C. 154(b) by 1397 days.

(21) Appl. No.: 14/159,152

(22) Filed: Jan. 20, 2014

(65) Prior Publication Data
US 2014/0257720 A1  Sep. 11, 2014

Related U.S. Application Data

(60) Provisional application No. 61/775,094, filed on Mar. 8, 2013.

(51) Int. Cl.
  *G05D 7/06* (2006.01)
  *G01F 1/684* (2006.01)

(52) U.S. Cl.
  CPC .................. *G01F 1/6847* (2013.01)

(58) Field of Classification Search
  CPC . G05D 7/0635; G01F 25/0007; G01F 15/024; G01F 15/002; G01F 15/005; G01F 1/6842; G01F 1/6847; G01F 5/00
  USPC .............................. 702/45, 190; 73/1.16, 1.34
  See application file for complete search history.

(56) References Cited

U.S. PATENT DOCUMENTS

| | | | |
|---|---|---|---|
| 5,911,238 A | 6/1999 | Bump et al. | |
| 6,389,364 B1 * | 5/2002 | Vyers | G01F 1/6847 137/486 |
| 7,113,895 B2 | 9/2006 | Tariq | |
| 7,845,913 B2 | 12/2010 | Stiles, Jr. et al. | |

(Continued)

FOREIGN PATENT DOCUMENTS

| | | |
|---|---|---|
| CN | 101583916 A | 11/2009 |
| CN | 102467132 A | 5/2012 |

(Continued)

OTHER PUBLICATIONS

Kawato, Takashi, "International Search Report and Written Opinion re Application No. PCT/IB2014/000666", dated Jul. 4, 2014, p. 5, Published in: JP.

(Continued)

*Primary Examiner* — Leslie J Evanisko
(74) *Attorney, Agent, or Firm* — Neugeboren O'Dowd PC

(57) ABSTRACT

A mass flow controller and associated methods for providing indicated flow from the mass flow controller are disclosed. The method may include obtaining a measured flow signal indicative of a mass flow rate of a fluid that is controlled by the mass flow controller and filtering the measured flow signal to generate indicated flow that provides a representation of the actual mass flow rate of the fluid. The indicated flow is provided to an operator of the mass flow controller, and a rate of change of the mass flow rate of the fluid is determined based upon samples of the measured flow signal. A time constant used in connection with the filtering is then adjusted based upon the rate of change of the mass flow rate.

19 Claims, 10 Drawing Sheets

(56) References Cited

U.S. PATENT DOCUMENTS

| | | | |
|---|---|---|---|
| 2002/0161559 A1* | 10/2002 | Tariq | G05B 13/021 |
| | | | 702/190 |
| 2009/0312876 A1 | 12/2009 | Yoneda et al. | |
| 2011/0015791 A1 | 1/2011 | Smirnov et al. | |
| 2011/0054702 A1 | 3/2011 | Smirnov et al. | |
| 2012/0116596 A1 | 5/2012 | Yoneda et al. | |

FOREIGN PATENT DOCUMENTS

| | | |
|---|---|---|
| JP | 61-249103 A | 11/1986 |
| JP | H03135730 A | 6/1991 |
| JP | 10111152 A | 4/1998 |
| JP | 2007034550 A | 2/2007 |
| TW | 201111933 A | 4/2011 |
| TW | 201111934 A | 4/2011 |
| WO | 2001004716 A1 | 1/2001 |
| WO | 2002088639 | 7/2002 |

OTHER PUBLICATIONS

SIPO, "Chinese Office Action Re Application No. 201480001522.1", dated Feb. 24, 2017, p. 18, Published in: CN.

Yamamura, Hidemasa, "Notification of Reasons for Refusual" Re: Japanese Application No. 2015-560799, dated Oct. 17, 2017, p. 6, Published in: JP.

Yamamura, Hidemasa, "Report of Reconsideration by Examiner before Appeal" for Japanese Patent Application No. 2015-560799, Appeal No. 2018-005431, dated May 22, 2018, published in JP, p. 6.

* cited by examiner

SYSTEM AND METHOD FOR IMPROVED INDICATED FLOW IN MASS FLOW CONTROLLERS

PRIORITY

The present Application for Patent claims priority to Provisional Application No. 61/775,094 entitled "READ-BACK SYSTEM AND METHOD FOR MASS FLOW CONTROLLERS" filed Mar. 8, 2013, and assigned to the assignee hereof and hereby expressly incorporated by reference herein.

FIELD OF THE INVENTION

The present invention relates to mass flow control systems, and in particular, but not by way of limitation, the present invention relates to systems and methods for monitoring and controlling a flow of a fluid.

BACKGROUND OF THE INVENTION

A typical mass flow controller (MFC) is a device that sets, measures, and controls the flow of a fluid gas in industrial processes such as thermal and dry etching among other processes. An important part of an MFC is a thermal flow sensor that measures the mass flow rate of the gas flowing through the device. While the thermal flow sensor is measuring actual flow, the indication of the measured flow is reported to the user/operator as an "indicated flow" via an indicated flow output. In many instances, however, it is not desirable to report the actual signal from the thermal sensor as the indicated flow to the user/operator of the MFC because the actual signal from the thermal sensor may misrepresent the actual fluid flow and may produce false alarms.

The thermal flow sensor of a mass flow controller (MFC) generally produces a very slow signal even when the actual flow is changing fast. Because the response time of the sensor is critical for stable control of the fluid flow, the slow signal from the thermal flow sensor is typically accelerated by processing it with "acceleration" filters. This type of acceleration, however, also increases the signal noise, but this "acceleration noise" does not reflect the actual noise of fluid flow running through the sensor—it is just a side effect of making the signal faster. Although the acceleration noise does not affect the algorithm that controls the flow rate, it can give the wrong impression to an operator of the MFC about the quality of actual fluid flow. Even worse, the acceleration noise can trigger a false alarm on the processing tool. As a consequence, to avoid false alarms, the acceleration noise should be reduced as much as possible when reporting flow to the MFC operator.

Due to the design of MFCs, during some conditions there may be some "internal" flow in the MFC that is undesirable to report to an operator of the MFC. This internal flow does not go to the output of MFC (to the processing tool), but it may pass through the flow sensor, and it may be reported to the operator as an actual flow delivered to the processing tool when in reality the sensed internal flow is not delivered to the processing tool. This internal flow may happen, for example, when inlet pressure changes, and some amount of fluid fills in a "dead volume" (the volume between the flow sensor and valve) to equalize the pressure across the flow sensor. Such a flow is strictly internal and should not be reported to customer.

Another example of aspects of the thermal flow sensor signal that should not be reported to the operator are possible sharp spikes of the fluid flow through the sensor at the moment when valve is moving a long distance very quickly. Usually these long and fast valve movements occur when a non-zero-flow set point is given after a zero-flow set point, and vice versa.

Although there have been attempts to filter the indicated flow that is provided to an operator (e.g., to reduce false alarms), some of the prior approaches rely upon sophisticated algorithms that have proven to be unworkable in many instances because they utilize empirical parameters that may substantially vary from actual operating conditions.

Many of the existing filters are low pass filters ("LPF") with an adjustable time constant. A disadvantage of this type of filter is the manner the time constant is adjusted in an attempt to provide an acceptable indicated flow output. Usually this adjustment of the data is done based on an allowed flow deviation off a baseline (set point). When measured flow is within a specified threshold off the set point, the filter time constant is high, so that the noise reduction is high. And if, for any reason, flow readings move out of specified range, the filter time constant momentarily decreases, immediately producing a noisy indicated flow. As the flow returns back to the set point, the filter time constant slowly increases; thus the noise slowly decreases. From a user's point of view, such behavior of the indicated flow makes it appear as though there are instantaneous "flow oscillations," or an instability, but these aberrations are just a result of inadequate filtering of the indicated flow and do not represent actual flow.

Some other algorithms simply hide the measured flow while the measured values are out of an allowed range (typically around the flow set point), and these algorithms typically generate an indicated flow output that reports constant flow until the actual flow (as measured) returns back to the set point. But if the flow deviation lasts too long, the filter starts showing actual flow immediately, which produces a flow spike in the indicated flow that does not really exist.

Accordingly, a need exists for a method and/or apparatus to provide new and innovative features that address the shortfalls of present methodologies in generating an indicated flow of fluid flow conditions.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Aspects of the present invention can provide a method for providing an indicated flow output from a mass flow controller. The method includes obtaining a measured flow signal indicative of a mass flow rate of a fluid that is controlled by the mass flow controller and filtering the measured flow signal to generate an indicated flow output that provides a representation of the actual mass flow rate of the fluid. The indicated flow is provided to an operator of the mass flow controller, and a rate of change of the mass flow rate of the fluid is determined based upon samples of the measured flow signal. A time constant used in connection with the filtering is then adjusted based upon the rate of change of the mass flow rate.

Another aspect of the present invention may be characterized as a mass flow controller that includes a mass flow sensor that provides a measured flow signal indicative of a mass flow rate of a fluid. A processor of the mass flow controller receives the measured flow signal and provides an indicated flow output. The mass flow controller also includes a non-transitory, tangible processor readable storage medium coupled to the processor that is encoded with processor readable instructions for filtering the indicated flow. The instructions include instructions for determining a rate of change of the mass flow rate of the fluid based upon the measured flow signal and adjusting a time constant used in connection with the filtering based upon the rate of change of the mass flow rate.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
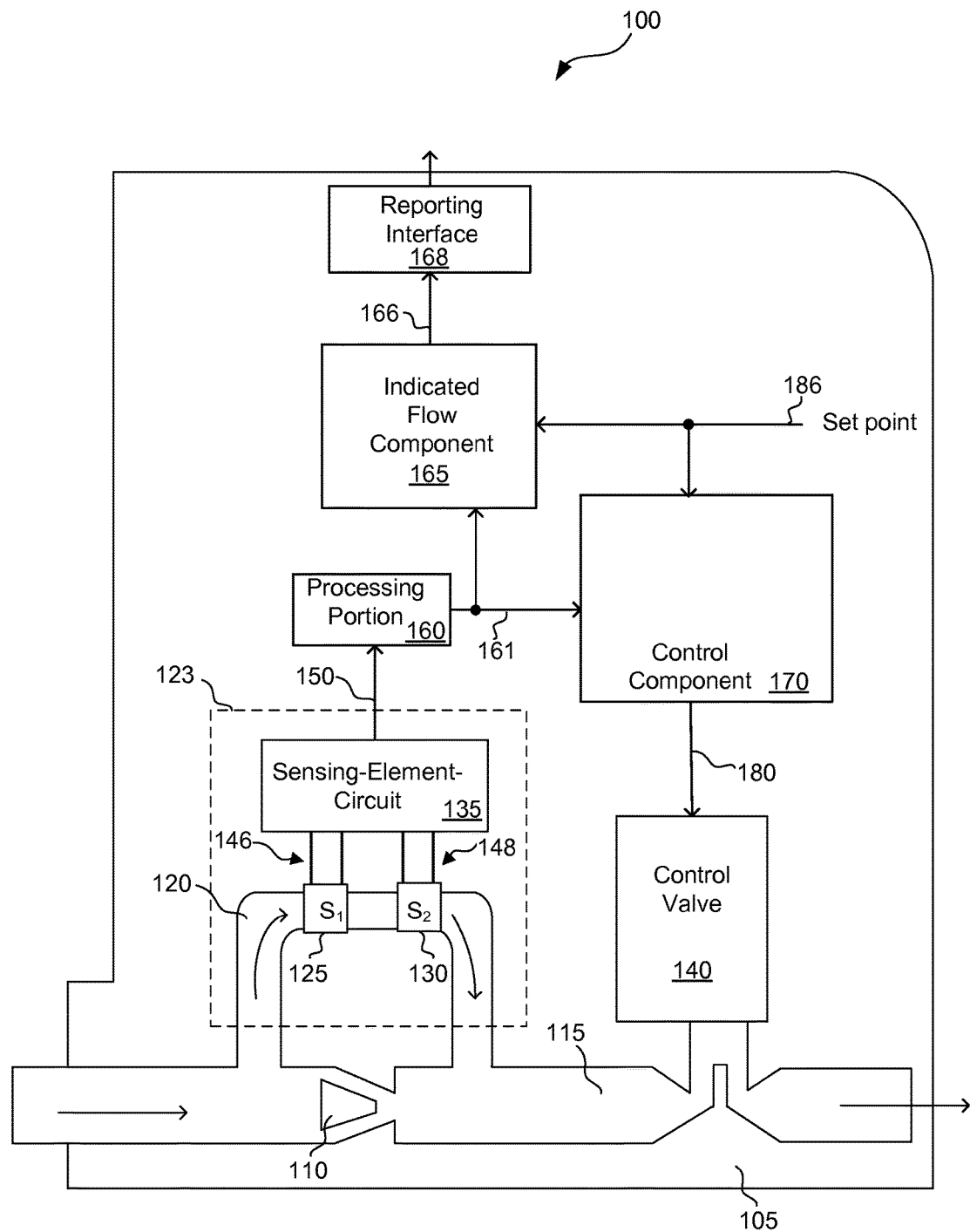
FIG. 1 is a block diagram that illustrates an exemplary embodiment of a mass flow controller in accordance with the invention.

Referring now to the drawings, FIG. 1 illustrates a mass flow controller (MFC) 100 that incorporates improved methodologies for reporting indicated flow to an operator of the MFC 100. The illustrated arrangement of these components is logical and not meant to be an actual hardware diagram. Thus, the components can be combined, further separated, deleted and/or supplemented in an actual implementation. As one of ordinary skill in the art will appreciate, the components depicted in FIG. 1 may be implemented in hardware, or hardware in combination with firmware and/or software. Moreover, in light of this specification, the construction of each individual component is well known within the skill of those of ordinary skill in the art.

In some embodiments, the fluid controlled by the MFC 100 is a liquid (e.g., sulfuric acid) and in other embodiments a gas (e.g., nitrogen), but a person skilled in the art will appreciate, having the benefit of this disclosure, that the fluid being delivered by the MFC 100 may be any kind of fluid including, for example, a mixture of elements and/or compounds in any phase, such as a gas or a liquid. Depending upon the application, the MFC 100 may deliver a fluid in a gaseous state (e.g., nitrogen) and/or a liquid state (e.g., hydrochloric acid) to, for example, a tool in a semiconductor facility. The MFC 100 in many embodiments is configured to deliver a fluid under high pressure, low temperature, or to different types of containers or vessels.

As depicted, in the present embodiment a base 105 of MFC 100 includes bypass 110 through which a gas flows. Bypass 110 directs a constant proportion of gas through main path 115 and sensor tube 120. As a consequence, the flow rate of the fluid (e.g., gas or liquid) through the sensor tube 120 is indicative of the flow rate of the fluid flowing through the main path 115 of the MFC 100.

In this embodiment, the sensor tube 120 is a small bore tube that is part of a thermal mass flow sensor 123 of the MFC 100. And as shown, sensing elements 125 and 130 are coupled to (e.g., wound around) the outside of sensor tube 120. In one illustrative embodiment, sensing elements 125 and 130 are resistance-thermometer elements (e.g., coils of conductive wire), but other types of sensors (e.g., resistance temperature detectors (RTD) and thermocouples) may also be utilized. Moreover, other embodiments may certainly utilize different numbers of sensors and different architectures for processing the signals from the sensors without departing from the scope of the present invention.

As depicted, sensing elements 125 and 130 are electrically connected to a sensing-element circuit 135. In general, the sensing-element circuit 135 is configured (responsive to signals 146, 148 from the sensing elements 125, 130) to provide a flow sensor signal 150, which is indicative of the flow rate through the sensor tube 120, and hence, indicative of the flow rate through the main path 115 of the MFC 100.

As shown in FIG. 1, the flow sensor signal 150 may be processed by a processing portion 160 to generate a measured flow signal 161 that is a processed representation of the flow sensor signal 150. For example, the measured flow signal 161 may be a digital representation of the flow sensor signal 150. More specifically, the processing portion 160 may amplify and convert, using an analog to digital converter, the flow sensor signal 150 to a digital representation of the flow sensor signal 150.

As one of ordinary skill in the art will readily recognize, the processing portion 160 may also adjust the flow sensor signal 150 (e.g., by adjusting the signal 150 with predetermined calibration coefficients) based upon physical characteristics of the MFC 100 and/or characteristics of the fluid (e.g., gas) flowing through the MFC 100.

As shown, the measured flow signal 161 is fed to both an indicated flow component 165 and a control component 170. The control component 170 in this embodiment is part of a control system that includes sensing elements 125 and 130, sensing-element circuit 135, and the processing portion 160. The control component 170 is generally configured to generate a control signal 180 to control a position of the control valve 140 in order to provide a flow rate based upon a set point signal 186. The control valve 140 may be realized by a piezoelectric valve or solenoid valve, and the control signal 180 may be a voltage (in the case of a piezoelectric valve) or current (in the case of a solenoid valve).

As shown, the indicated flow component 165 in this embodiment also receives the set point 186 and provides indicated flow via an indicated flow output 166 to a reporting interface 168. In general, the indicated flow component 165 receives the measured flow signal 161 and provides the indicated flow (via the indicated flow signal 166 and the reporting interface 168) that is more useful to an operator of the MFC 100 than the raw, measured flow signal 161. For example the indicated flow provides a more accurate representation of the actual flow during fast changes to the flow rate and during steady state operation. As compared to prior approaches, the indicated flow includes less noise, fewer spikes (that are not representative of the actual flow), and less extraneous information that is not indicative of the actual flow.

In contrast to prior approaches, the depicted indicated flow component 165 does not utilize flow deviation off the set point (or other specified threshold) to control a time constant of a filtering component. Instead, as discussed further herein, the indicated flow component 165 tracks a rate of change of the measured flow (as indicated by the measured flow signal 161), and adjusts the filter time constant accordingly to provide the indicated flow, which closely follows actual flow with an accuracy that is substantially improved over the prior approaches. As a result, the filter time constant does not change abruptly and produces neither "oscillations" nor spikes in the indicated flow; thus providing an operator of the MFC 100 an indicated flow output 166, which is less misleading and more useful than prior approaches.

In addition, as disclosed in more detail further herein, the indicated flow component 165 in some embodiments also utilizes additional methodologies to mask spikes to prevent the reporting of erroneous spikes and other deviations caused by internal MFC flow (during fast valve opening or closing), which should not be reported to the operator/user of the MFC 100. Moreover, the indicated flow component 165 may also implement novel methods to create a smoother and low-noisy indicated flow output 166 during fast flow rate changes that may occur due to, for example, set point changes and/or pressure changes.

For example, in many modes of operation, when there is a rapid change in flow rate (e.g., when a new set point is given to the MFC 100), the time constant of the indicated flow filter is set to a minimum value, thus providing a fast indicated flow output 166 that is close to representing the actual flow, but this fast indicated flow is prone to being very noisy. The implementation of the improved smoothing algorithm disclosed herein provides an indicated flow that is close to the actual flow readings with substantially less noise.

Figure 2:
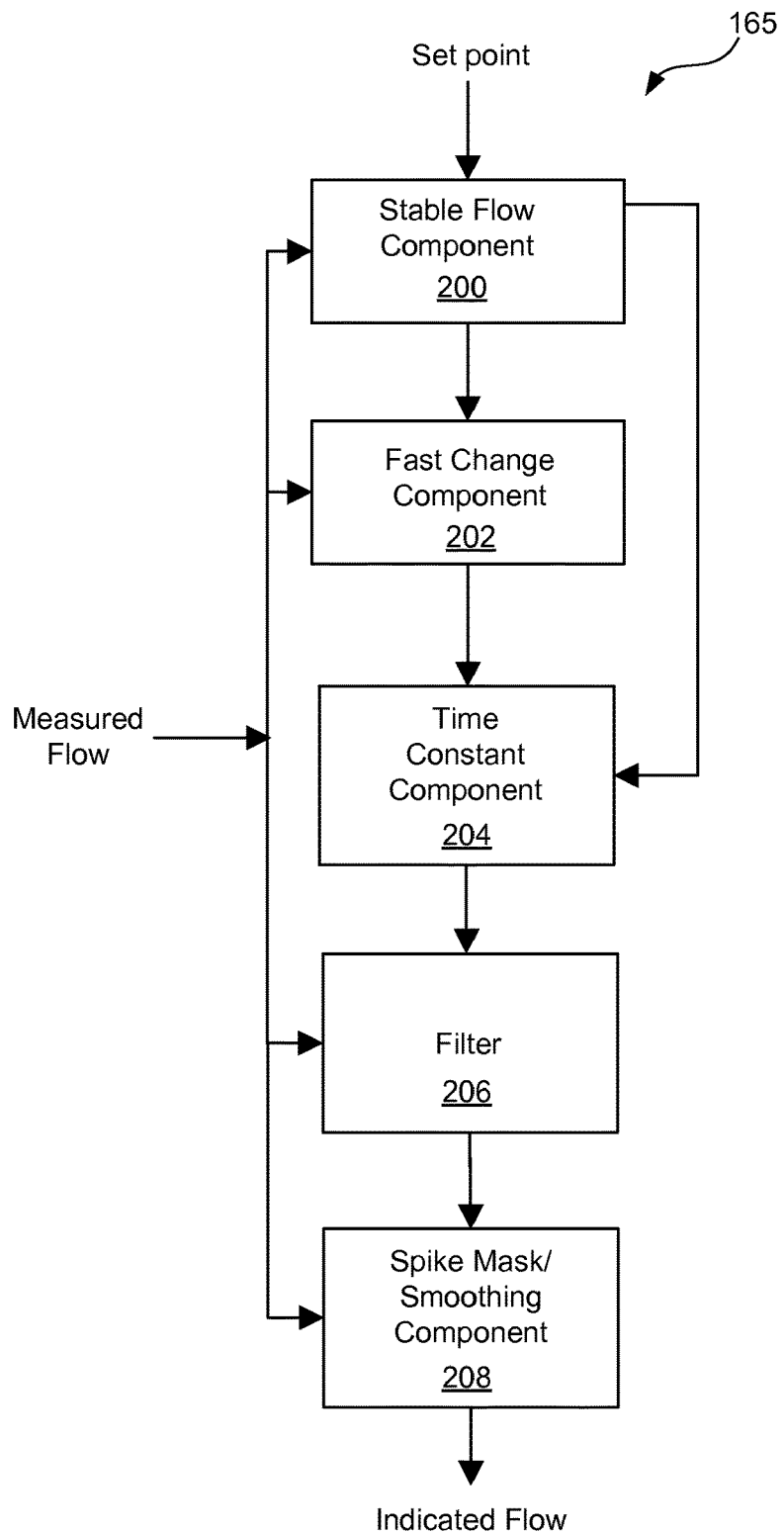
FIG. 2 is a block diagram depicting functional components of the indicated flow component depicted in FIG. 1.

Referring next to FIG. 2, shown is a block diagram depicting functional components of the indicated flow component 165. As shown, in this embodiment the indicated flow component 165 includes a stable flow component 200, a fast change component 202, a time constant component 204, a filter 206, and a spike mask/smoothing component 208. As shown, the stable flow component 200 and the fast change component 202 are both coupled to the time constant component 204, which provides a time constant to the filter 206. In this embodiment the measured flow signal 161 of sensor output 150 provides an indication of the measured flow to the stable flow component 200, the fast change component 202, the filter 206, and the spike mask/smoothing component 208. It should be recognized that one or more of the depicted components may be combined, further separated, removed and/or supplemented in an actual implementation, and these components may be implemented in hardware or hardware in combination with firmware and/or software.

As one of ordinary skill in the art will appreciate, the filter 206 may include a low-pass filter to attenuate, based upon a time constant signal from the time constant component 204, higher frequencies of the measured flow signal that are misrepresentative of the actual mass flow rate. As discussed below, the stable flow 200 and fast change 202 components operate to provide inputs to the time constant component 204, which in turn, alters the time constant provided to the filter 206.

The stable flow component 200 in this embodiment generally operates in connection with the time constant component 204 to track a rate of change of the measured flow during relative stable modes of operation and adjust the filter time constant accordingly to provide an indicated flow which closely follows actual flow with improved accuracy. As a result, the filter time constant does not change abruptly and produces neither "oscillations" nor spikes in the indicated flow.

As discussed further herein, the fast change component 202 is engaged when there is an abrupt change to the mass flow rate, which may be caused by a change to the set point 186, a change in operating pressure, or any other factor that affects the flow rate. When engaged, the fast change component 202 operates in connection with the time constant component 204 to allow the time constant (that is utilized by the filter 206) to change quickly to provide a more accurate indicated flow without delay or dead time.

The spike mask/smoothing component 208 in this embodiment does not affect the time constant that is utilized by the filter 206, but it does reduce the reporting of erroneous spikes and deviations caused by flow dynamics that are internal to the MFC 100 (e.g., caused by the valve 140 opening and closing). Moreover, the spike mask/smoothing component 208 also operates to produce a smoother indicated flow with less noise when there is a fast change to the mass flow rate of a fluid through the MFC 100.

Figure 3:
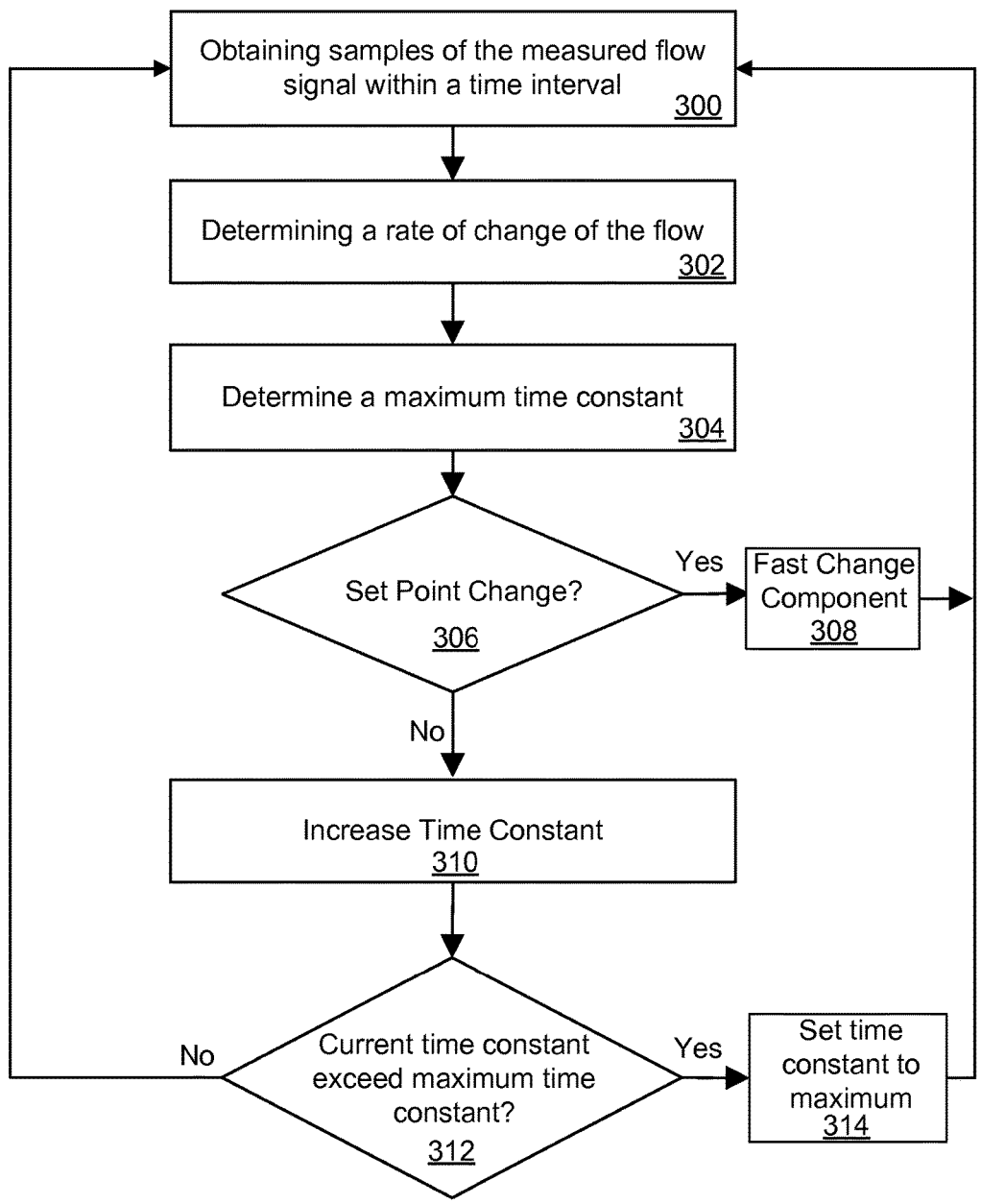
FIG. 3 is a flowchart depicting an exemplary method that may be traversed in connection with the embodiments depicted in FIGS. 1 and 2.

Referring next to FIG. 3, it is a flowchart depicting a method that may be performed by the stable flow component 200. As depicted, samples of the measured flow signal 161 are obtained within a time interval to enable a rate of change of the flow to be determined (Blocks 300, 302). For example, the rate of change of the measured flow may be calculated by subtracting two flow readings taken within a fixed time interval, and for a more accurate calculation, averaged readings are used (for example, a 10 point moving average may be used). In several embodiments, the fast change component 202 continuously tracks the rate of change of the actual flow.

As shown, a maximum time constant is then determined based upon the determined rate of change (Block 304). In many implementations, the maximum time constant is inversely proportional to the amplitude of the rate of change and proportional to a specified error. This approach makes the difference between actual flow and reported flow to be less than a specified error at any rate of flow change. In some implementations the maximum time constant may be calculated as:

$$TCmax = A * error/rate\_of\_change$$

where A is a scaling coefficient that depends on a sampling rate of the system and the units of the "TCmax," "error" and "rate_of_change" values.

As shown, if there is a set point change or other event (e.g., a substantial pressure change), which leads to a rapid change in the flow rate (Block 306), the fast change component 202 is engaged to handle control of the time constant component 204 as discussed in more detail with reference to FIGS. 6A and 6B (Block 308). If there is not set point change (or other event that abruptly affects the flow rate)(Block 306), then the time constant is increased (Block 310). The time constant may be incremented by 1 (or other constant value) at every control loop cycle, until it reaches a maximum allowed time constant (Block 312).

As shown, if the current time constant exceeds a maximum allowed time constant (Block 312), the time constant is set to a maximum value (Block 314), the rate of change of the measured flow continues to be tracked, and the maximum time constant is adjusted accordingly as the loop depicted in FIG. 3 is repeated. In some implementations, a user-defined range of the time constant can be applied (e.g., a minimum and maximum time constant) in order to provide a desired guaranteed level of noise reduction.

Figure 4:
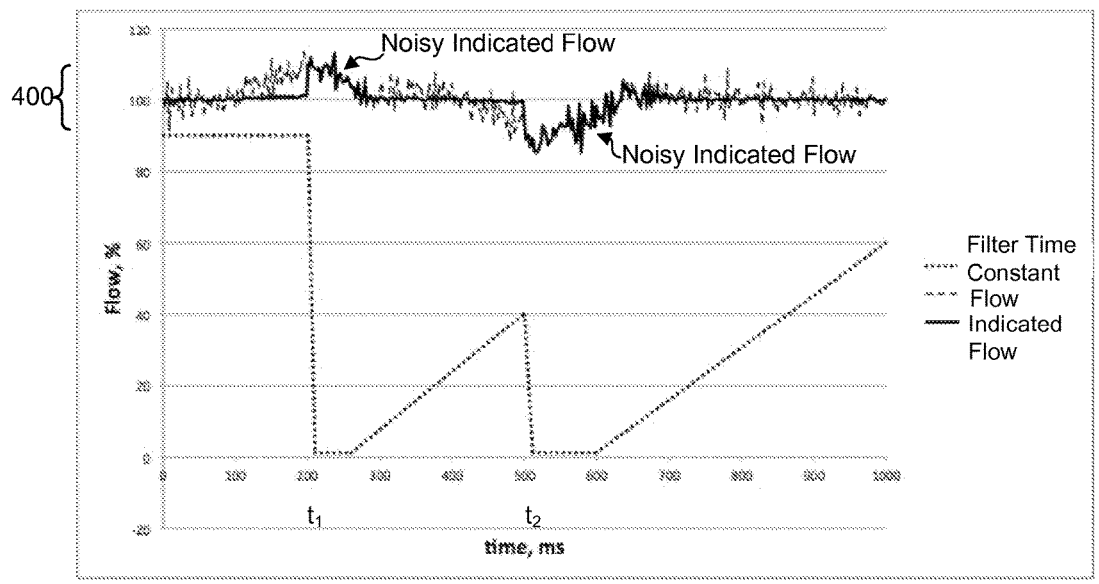
FIG. 4 is a graph depicting behavior of a filter time constant that is consistent with the prior art.
Figure 5:
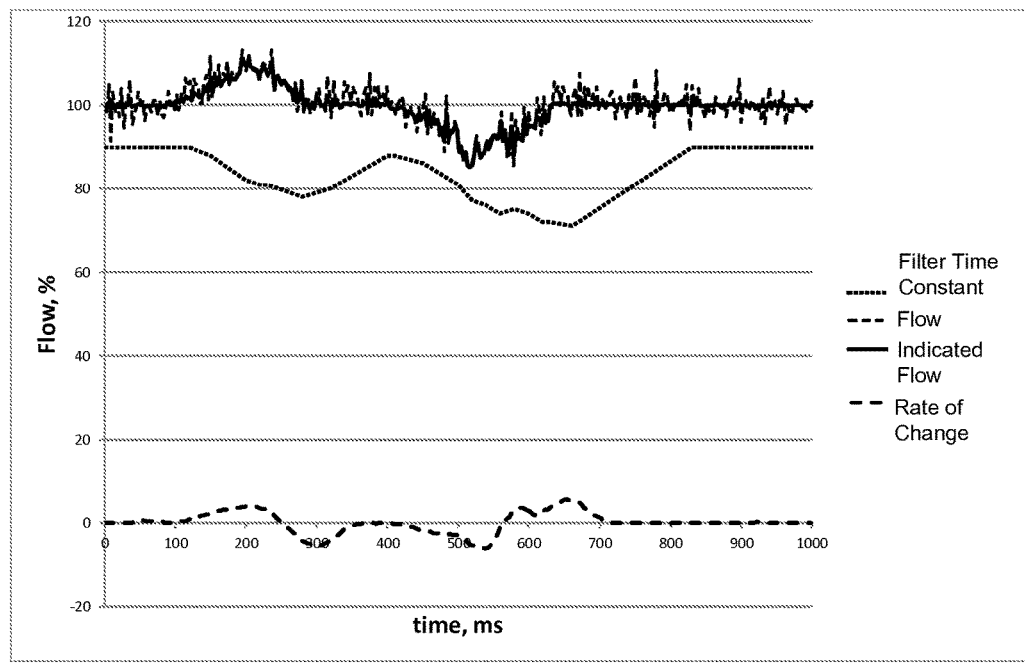
FIG. 5 is a graph depicting time constant values consistent with the inventive method described with reference to FIG. 3.

Referring to FIGS. 4 and 5, shown are graphs depicting values of a filter time constant in a prior art approach and values of a time constant consistent with the inventive method of FIG. 3, respectively. As depicted in FIG. 4, in some prior art approaches a filter time constant is adjusted based on an allowed flow deviation range 400 off of a baseline (set point). As shown in FIG. 4, when the measured flow is within the flow deviation range 400 of the set point of 100% flow, the filter time constant is high, so that the noise reduction is high. And if, for any reason, flow readings move out of specified range 400 (e.g., as depicted at times $t_1$ and $t_2$), the filter time constant abruptly decreases, immediately producing a noisy indicated flow. As the flow returns back to the set point, the filter time constant slowly increases; thus the noise slowly decreases. From the user's point of view, such indicated flow behavior makes it appear as though there are instantaneous "flow oscillations," or an instability, but these aberrations are just a result of inadequate filtering and do not represent actual flow.

In contrast to the prior art mode of operation depicted in FIG. 4, the methodology in FIG. 3 produces a filter time constant that does not change abruptly and reduces the "oscillations" and spikes in the indicated flow as depicted in FIG. 5. As shown, the filter time constant varies—without abrupt step-like changes—as the rate of change of the flow rate, and as a consequence, the indicated flow is less noisy. And when viewed by the user/operator, the indicated flow does not appear as though there are flow oscillations or instabilities.

Figure 6A:
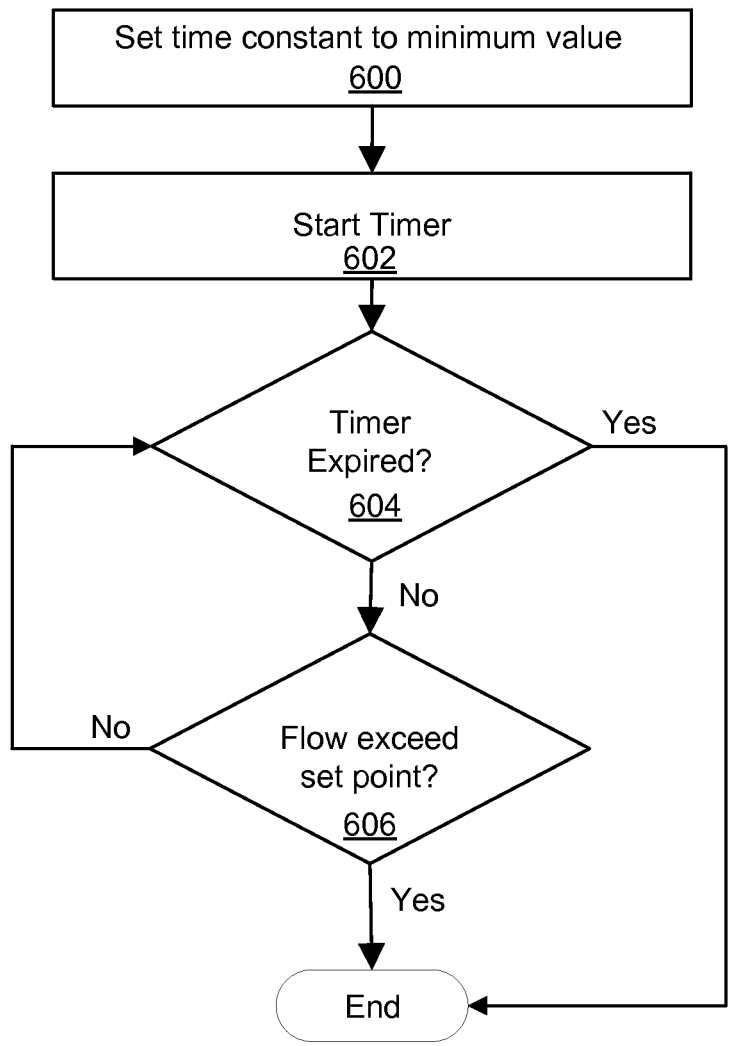
FIG. 6A depicts another method that may be traversed in connection with the embodiments depicted in FIGS. 1 and 2.
Figure 6B:
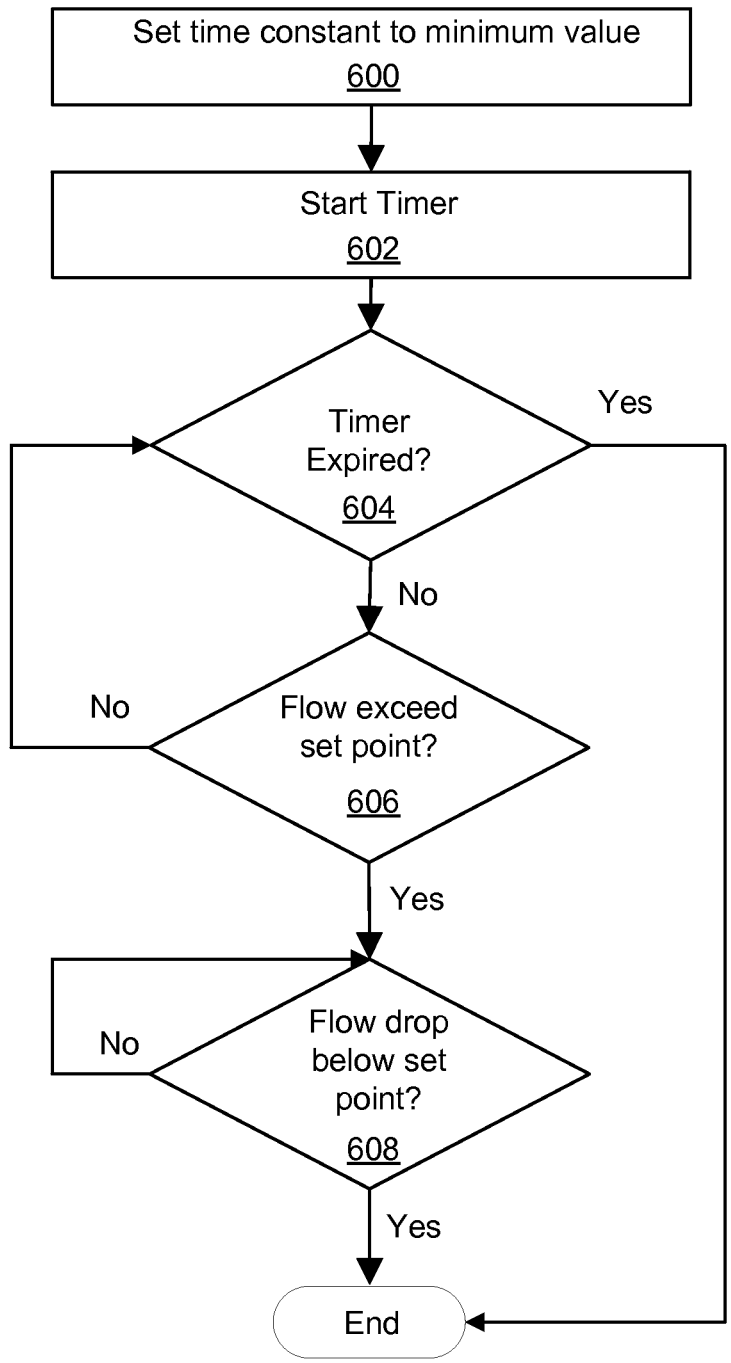
FIG. 6B depicts yet another method that may be traversed in connection with the embodiments depicted in FIGS. 1 and 2.

Referring next to FIGS. 6A and 6B, shown are alternative methods that may be traversed by the fast change component 202 in response to a rapid change in flow rate (e.g., due to a set point change). For ease of description, it is assumed that the change in set point is an increase in set point, but the methods depicted in FIGS. 6A and 6B also apply in response to a set point decrease as discussed further herein below.

The method depicted in FIG. 6B may be more advantageous than the method depicted in FIG. 6A if overshoot and slight oscillations are expected. As described below, the method in FIG. 6B allows the measured signal to exceed the set point, and then drop below the set point. Or in the event of a set point decrease, the measured flow is allowed to drop below the set point and then exceed the set point before the stable flow methodology depicted in FIG. 3 is again utilized.

Figure 7:
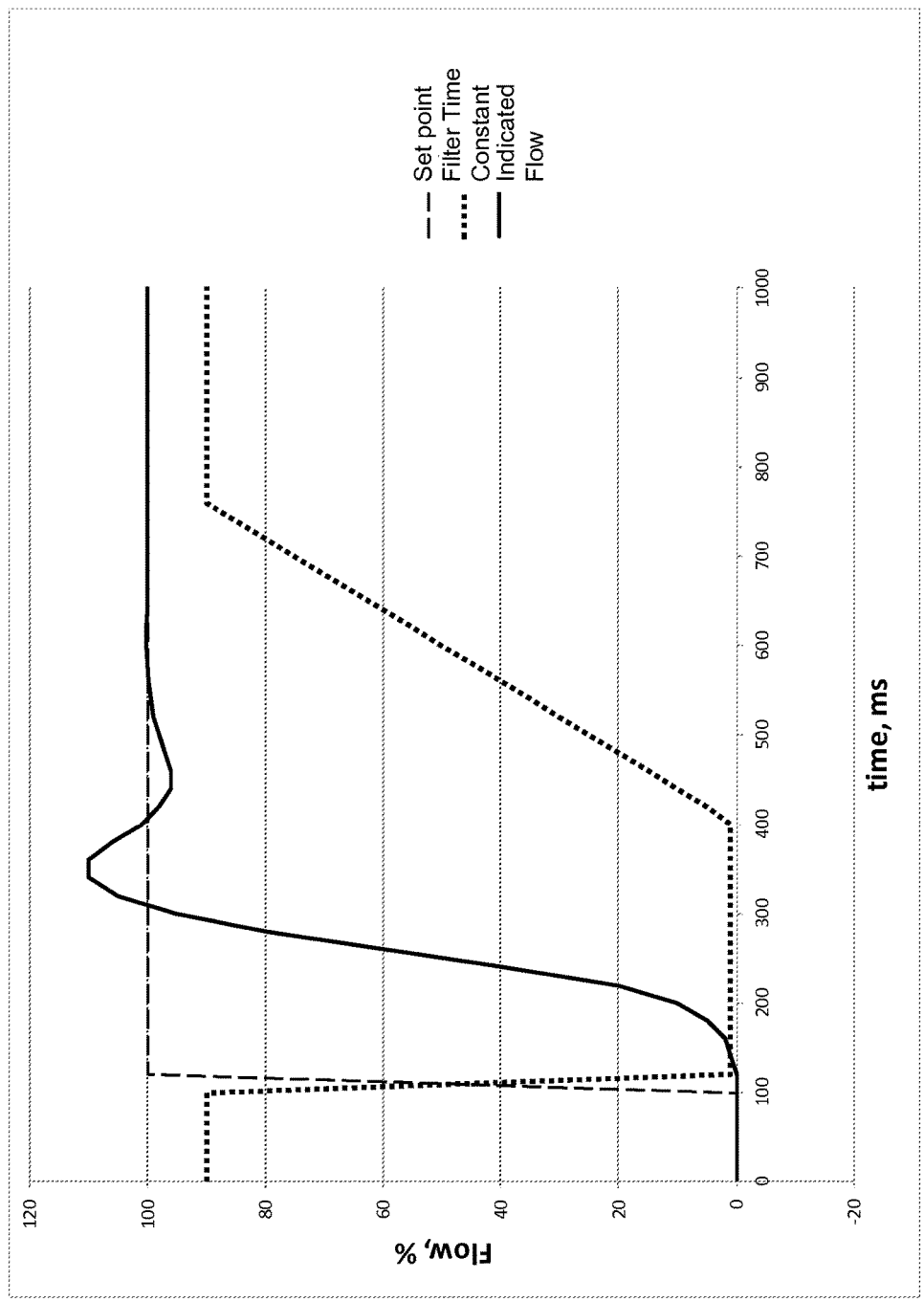
FIG. 7 is a graph that depicts an indicated flow and filter time constant values consistent with the method described with reference to FIG. 6B.

As shown in both of the methods depicted in FIGS. 6A and 6B, the current time constant is set to a value that applies relatively little filtering (Block 600). For example, the time constant may be set to apply a minimum value, no filtering, or other low-level value in response to a set point change. FIG. 7, for example, is a graph depicting an increase in set point and the corresponding drop in the time constant.

As shown in FIGS. 6A and 6B, a timer is started (Block 602), and if neither an established time duration has transpired (after the time constant is set to the relatively low value)(Block 604) nor the measured flow exceeds the set point (Block 606), the time constant is maintained at the relatively low level. But if the timer has expired (Block 604), then the algorithms depicted in FIGS. 6A and 6B are complete, and the stable flow component 200 reengages control of the time constant component from the fast change component 202.

In the method depicted in FIG. 6A, if the time has not expired (Block 604), but the flow exceeds the set point (Block 606), then the algorithm depicted in FIG. 6A is complete, and the stable flow component 200 reengages control of the time constant component 204 from the fast change component 202. If the set point change is a decrease in the flow set point, then the algorithm depicted in FIG. 6A is disengaged when the flow drops below the decreased set point.

In contrast to the method depicted in FIG. 6A, in the method depicted in FIG. 6B, if the flow exceeds the set point (Block 606), but the flow has not dropped back below the set point (Block 608), then the time constant is maintained at the relatively low level. And if the flow drops back below the set point (Block 608), the stable flow component 200 reengages control of the time constant component 204 from the fast change component 202 and prompts an increase to the time constant. FIG. 7, for example, is a graph that depicts the indicated flow and filter time constant relative to the set point. As shown, the stable flow component 200 is reengaged to increase the time constant after the flow rate has dropped below the set point (after the exceeding the set point).

Figure 8:
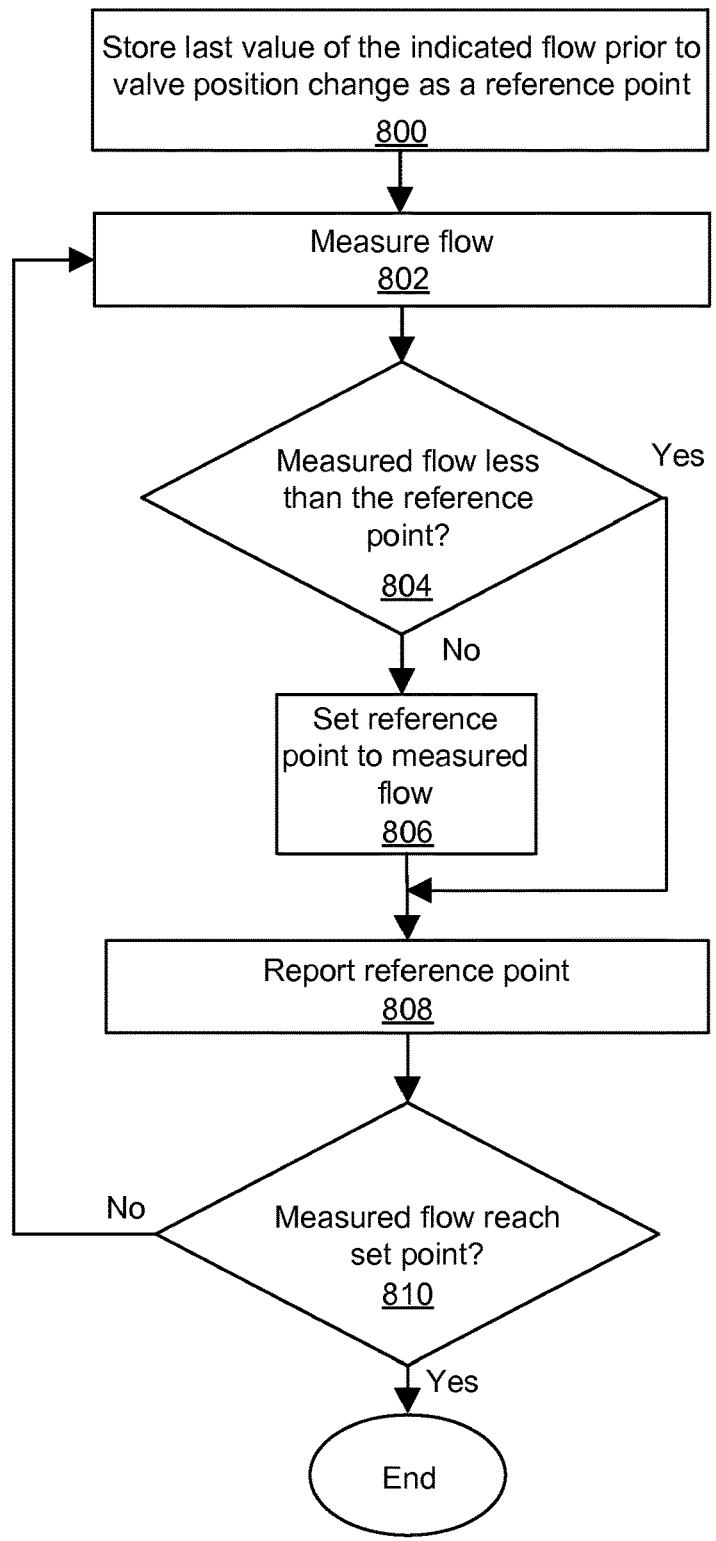
FIG. 8 is a flowchart depicting an additional method that may be traversed in connection with the embodiments depicted in FIGS. 1 and 2.

Referring next to FIG. 8, it is a flowchart depicting a method, associated with the spike mask/smoothing component 208, for smoothing the indicated flow output 166 and reducing spikes. In many embodiments, the spike mask/smoothing component 208 operates in parallel with the fast change component 202 to execute the algorithm depicted in FIG. 8 in connection with the algorithm depicted in either FIG. 6A or 6B. As discussed above with reference to FIGS. 6A and 6B, when there is a set point change, the fast change component 202 sets the time constant that is applied to the filter 206 to a relatively low value (e.g., minimum value) to provide a fast indicated flow output 166 that is close to the actual flow, but the filter 206 does not remove the noise because it is time-constant-based. As a consequence, the spike mask/smoothing component 208 removes the noise that goes unfiltered when the time constant is set to a low (e.g., potentially minimum) value.

For ease of description, in connection with FIG. 8 it is assumed that the valve is opening quickly (e.g., in response to the set point being set higher), but a similar algorithm (using opposite comparisons) is utilized when the valve is quickly closing (e.g., in response to a set point decrease). As shown in FIG. 8, if there is an event that prompts the valve 140 to open or close quickly (e.g., a change in the set point), the last value of the indicated flow, prior to the position change, is retained in memory as a reference point (Block 800).

Figure 9:
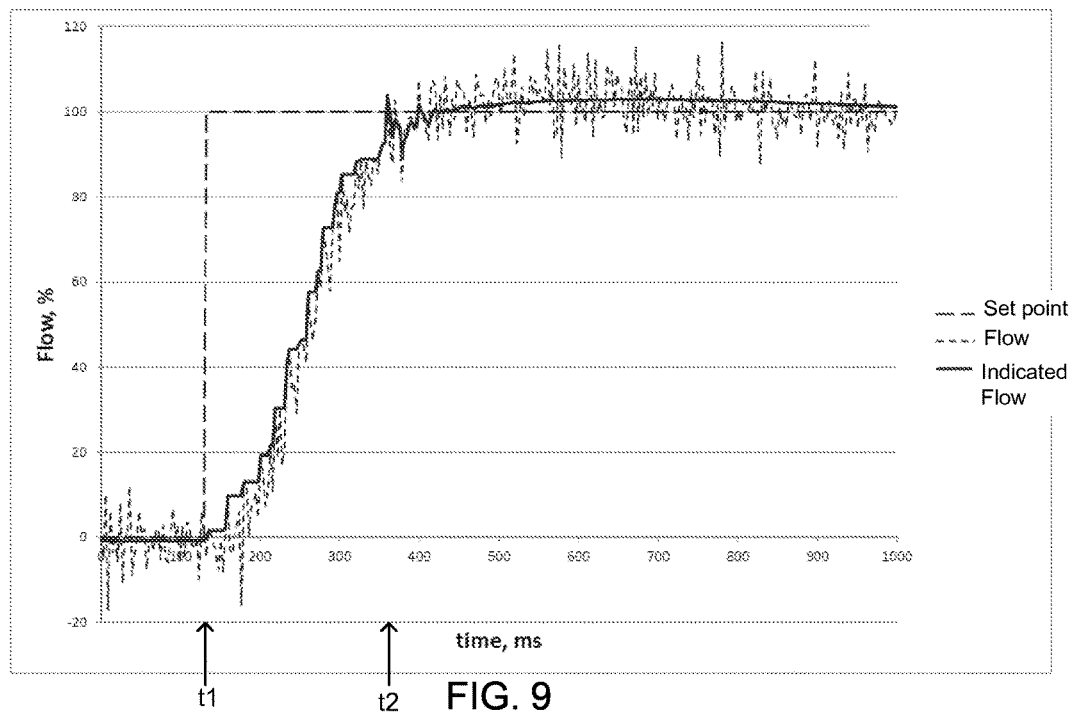
FIG. 9 is a graph depicting an exemplary indicated flow of flow percent values versus time consistent with the method depicted in FIG. 8.

As depicted in FIG. 8, the flow is measured (Block 802), and if the measured flow rate is not less than the reference point (Block 804), the reference point is set to the measured flow (Block 806) and then reported as the indicated flow (Block 808). But if the measured flow rate is less than the reference point (Block 804), the reference point is reported (Block 808) until the measured flow reaches the reference point (Block 810). Referring to FIG. 9 for example, shown is an instance when there is a change in set point at time t1. As shown, prior to the change in set point, the indicated flow was reporting zero flow, and as a consequence, the reference point is initially set to zero flow. As depicted in FIG. 9, after the set point increase at time t1, there is a substantial amount of noise in the measured flow signal, but the reference point is reported as the indicated flow value until the measured flow rises to the reference point at the time t2; thus the noise in measured flow between time t1 and t2 is not reported to the user/operator of the MFC 100.

Figure 10:
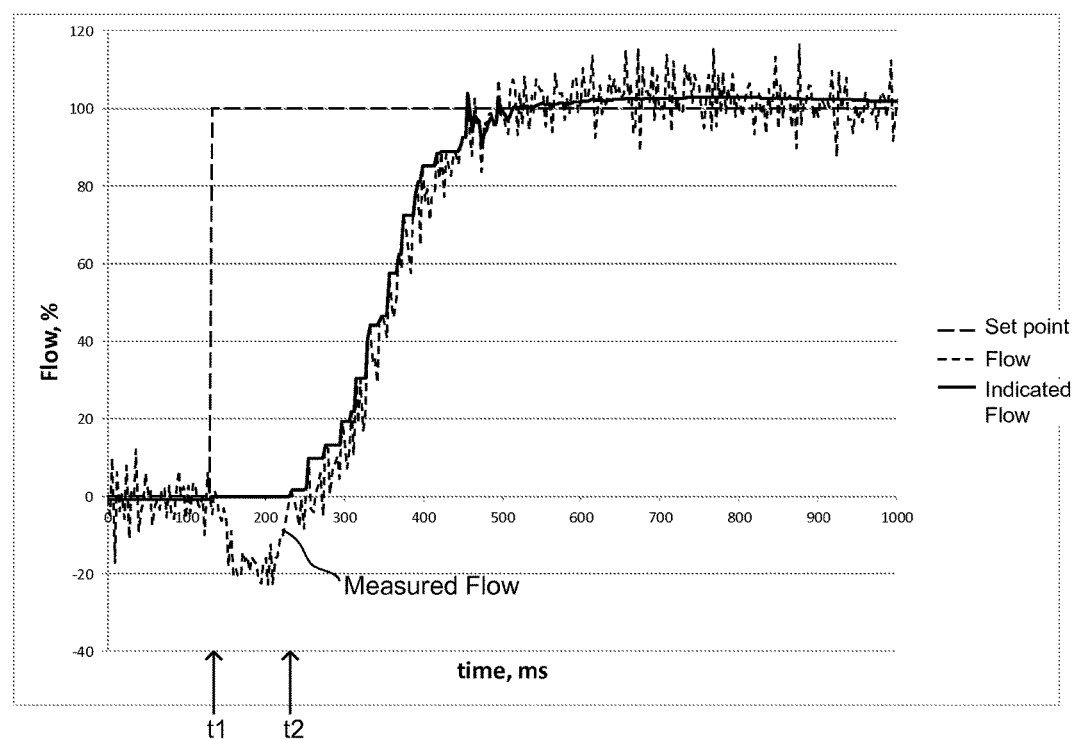
FIG. 10 is a graph depicting an exemplary indicated flow of flow percent values versus time consistent with the method depicted in FIG. 8.

In addition to noise, the spike mask/smoothing component 208 also removes spikes that may occur in the measured flow signal. As depicted in FIG. 10, for example, after the set point increase at time t1, the measured flow drops below the reference point, but the reference point (zero flow) continues to be reported as the indicated flow value until the measured flow rises to the reference point at the time t2; thus the spike in measured flow between time t1 and t2 is not reported to the user/operator of the MFC 100.

As shown in both FIGS. 9 and 10, as the measured flow increases in response to a set point change, the reference point is set to the measured flow (Block 806) during each iteration of the algorithm depicted in FIG. 8 until the measured flow reaches the set point (Block 810)—unless the measured flow drops below the current reference point (Block 804). As shown in FIGS. 9 and 10, when the measured flow is below the current reference point (Block 804), the current reference point is reported (Block 808) as the indicated flow instead of the measured flow. In this way, the noise and any spikes that would ordinarily be present in the indicated flow output 166 (due to the low time constant set by the fast change component) is removed.

Figure 11:
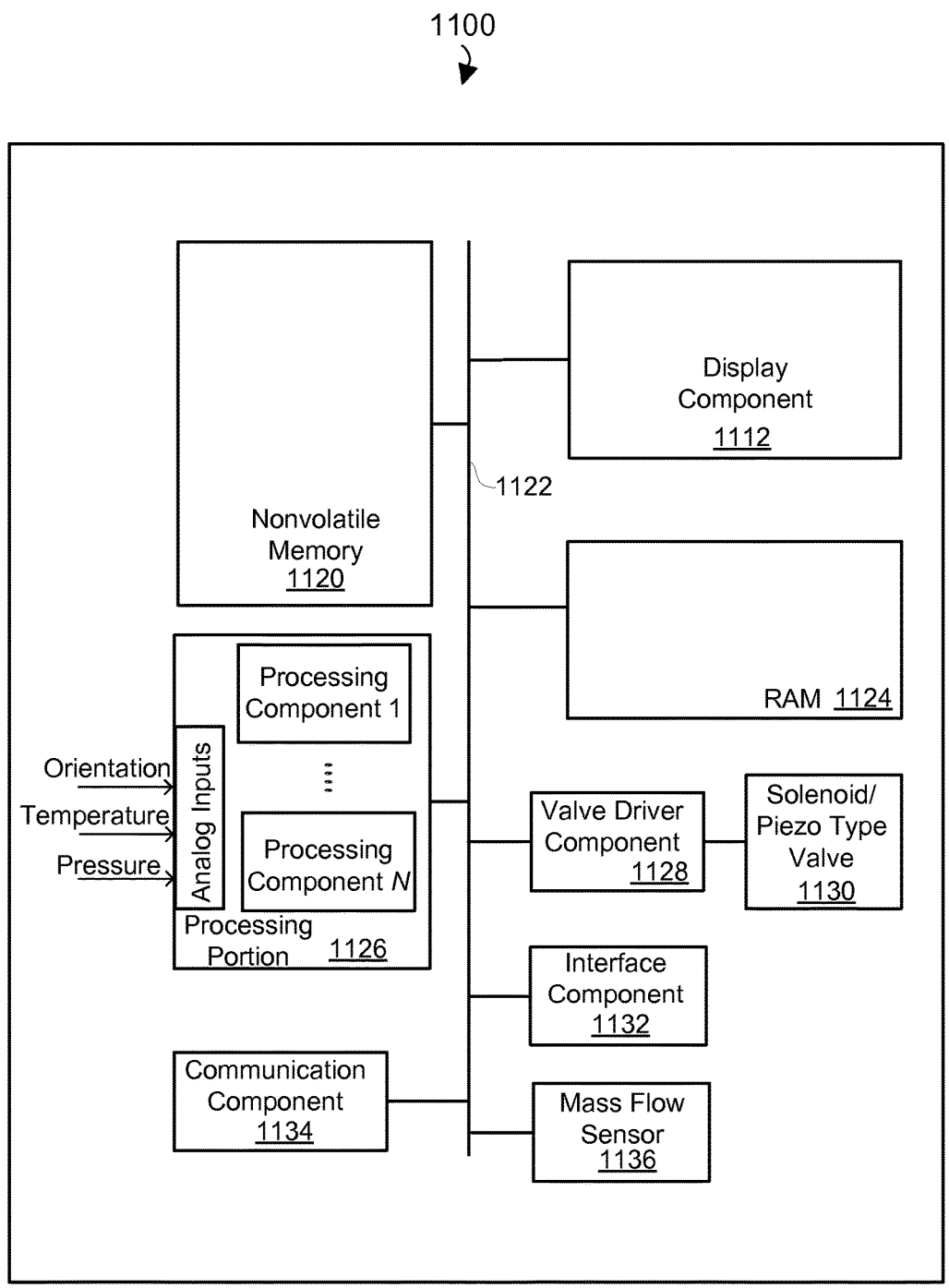
FIG. 11 is a block diagram depicting physical components that may be utilized to realize the various embodiments described herein.

Referring next to FIG. 11, shown is a block diagram 1100 depicting physical components that may be utilized to realize the MFC 100 described with reference to FIG. 1. As shown, a display portion 1112, and nonvolatile memory 1120 are coupled to a bus 1122 that is also coupled to random access memory ("RAM") 1124, a processing portion (which includes N processing components) 1126, a valve driver component 1128 that is in communication with a solenoid or piezo type valve 1130, an interface component 1132, a communication component 1134, and a mass flow sensor 1136. Although the components depicted in FIG. 11 represent physical components, FIG. 11 is not intended to be a hardware diagram; thus many of the components depicted in FIG. 11 may be realized by common constructs or distributed among additional physical components. Moreover, it is certainly contemplated that other existing and yet-to-be developed physical components and architectures may be utilized to implement the functional components described with reference to FIG. 11.

This display portion 1112 generally operates to provide a presentation of content to a user, and in several implementations, the display is realized by an LCD or OLED display. For example, the display 1112 may provide the indicated flow as a graphical or numeric representation of the indicated flow. In general, the nonvolatile memory 1120 functions to store (e.g., persistently store) data and executable code including code that is associated with the functional components depicted in FIG. 2. In some embodiments for example, the nonvolatile memory 1120 includes bootloader code, software, operating system code, file system code, and code to facilitate the implementation of one or more portions of the components discussed in connection with FIG. 2. In alternative implementations dedicated hardware may be utilized to implement one or more components depicted in FIG. 2. For example, a digital signal processor may be utilized to realize the filter depicted in FIG. 2.

In many implementations, the nonvolatile memory 1120 is realized by flash memory (e.g., NAND or ONENAND memory), but it is certainly contemplated that other memory types may be utilized. Although it may be possible to execute the code from the nonvolatile memory 1120, the executable code in the nonvolatile memory 1120 is typically loaded into RAM 1124 and executed by one or more of the N processing components in the processing portion 1126. As shown, the processing component 1126 may receive analog temperature and pressure inputs that are utilized by the functions carried out by the control component 170.

The N processing components in connection with RAM 1124 generally operate to execute the instructions stored in nonvolatile memory 1120 to effectuate the functional components depicted in FIG. 2.

The interface component 1132 generally represents one or more components that enable a user to interact with the MFC 100. The interface component 1132, for example, may include a keypad, touch screen, and one or more analog or digital controls, and the interface component 1132 may be used to translate an input from a user into the set point signal 186. And the communication component 1134 generally enables the MFC 100 to communicate with external networks and devices including external processing tools. For example, the indicated flow may be communicated to external devices via the communication component 1134. One of ordinary skill in the art will appreciate that the communication component 1134 may include components (e.g., that are integrated or distributed) to enable a variety of wireless (e.g., WiFi) and wired (e.g., Ethernet) communications.

The mass flow sensor 1136 depicted in FIG. 11 depicts a collection of components known to those of ordinary skill in the art to realize the mass flow sensor 123 shown in FIG. 1. These components may include sensing elements, amplifiers, analog-to-digital conversion components, and filters.

Those of skill in the art will appreciate that the information and signals discussed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will also appreciate that the various illustrative logical blocks, modules, circuits, and algorithm steps described in connection with the embodiments disclosed herein may be implemented by other alternative components than those depicted in FIG. 11. To clearly illustrate this interchangeability of hardware and hardware in combination with software, various illustrative components, blocks, modules, circuits, and steps have been described above generally in terms of their functionality. Whether such functionality is implemented as hardware or hardware in combination with firmware and/or software depends upon the particular application and design constraints imposed on the overall system. Skilled artisans may implement the described functionality in varying ways for each particular application, but such implementation decisions should not be interpreted as causing a departure from the scope of the present invention.

More specifically, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., the algorithms depicted in FIGS. 3, 6A, 6B, and 8) may be embodied directly in hardware, in a software module executed by a processor (e.g., as shown in FIG. 11), or in a combination of the two. A software module may reside in non-transitory processor readable mediums such as RAM memory, flash memory (e.g., non-volatile memory 1120), ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor, and the processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for providing indicated flow from a mass flow controller, the method comprising:
   providing a flow sensor signal from a sensing element circuit of the mass flow controller in response to a fluid passing through the mass flow controller;
   generating, with a processing portion of the mass flow controller, a measured flow signal from the flow sensor signal, the measured flow signal is indicative of a mass flow rate of the fluid;
   obtaining samples of the measured flow signal within a time interval and determining a rate of change of the mass flow rate of the fluid based upon the samples of the measured flow signal;
   adjusting a time constant used in connection with filtering the measured flow signal based upon the rate of change of the mass flow rate;
   filtering the measured flow signal using the adjusted time constant to generate an indicated flow that provides a representation of an actual mass flow rate of the fluid; and
   providing the indicated flow to an operator of the mass flow controller.

2. The method of claim 1, including:
   increasing the time constant until a maximum time constant is reached or until the rate of change of the mass flow rate exceeds a threshold.

3. The method of claim 2, including, when there is a set point change to a new set point:
   reducing the time constant;
   initiating a timer to track a time that has transpired since the time constant was reduced; and
   maintaining the time constant at a reduced level until the time that has transpired reaches a time threshold or until the measured flow signal indicates a measured flow rate either exceeds the set point if the new set point is an increase in the set point or the measured flow rate drops below the set point if the new set point is a decrease in the set point.

4. The method of claim 3, including:
   maintaining the time constant at the reduced level until the measured flow signal indicates the measured flow rate:
   exceeds the set point and then drops below the set point if the new set point is an increase in the set point; or
   drops below the set point and then exceeds the set point if the new set point is a decrease in the set point.

5. The method of claim 1 including, when a set point changes to a new set point:
   retaining a last value of the indicated flow in memory as a reference point, wherein the last value of the indicated flow is a mass flow rate provided as the indicated flow;
   performing, while a measured flow rate has not reached the new set point, a smoothing operation including:
   providing the reference point to the operator as the indicated flow if the measured flow rate is less than the reference point; and
   setting, if the measured flow rate is not less than the reference point, the reference point to the measured flow rate and providing the reference point to the operator as the indicated flow.

6. The method of claim 1, wherein providing the indicated flow to an operator of the mass flow controller includes providing the indicated flow to an operator of the mass flow controller via a display of the mass flow controller.

7. The method of claim 1, wherein providing the indicated flow to an operator of the mass flow controller includes providing the indicated flow to an operator of the mass flow controller via a communication component of the mass flow controller.

8. A mass flow controller comprising:
   a mass flow sensor that provides a measured flow signal indicative of a mass flow rate of a fluid;
   a processor to receive the measured flow signal and provide an indicated flow; and
   a non-transitory, tangible processor readable storage medium coupled to the processor and encoded with processor readable instructions for filtering the measured flow signal to provide the indicated flow, the instructions comprising instructions for:
   obtaining samples of the measured flow signal within a time interval and determining a rate of change of the mass flow rate of the fluid based upon the measured flow signal;
   adjusting a time constant used in connection with filtering the measured flow signal based upon the rate of change of the mass flow rate;

filtering the measured flow signal using the adjusted time constant to generate the indicated flow that provides a representation of an actual mass flow rate of the fluid; and providing the indicated flow to the operator of the mass flow controller.

9. The mass flow controller of claim 8, wherein the non-transitory, tangible processor readable storage medium is encoded with processor readable instructions that includes instructions for increasing the time constant until a maximum time constant is reached or until the rate of change of the mass flow rate exceeds a threshold.

10. The mass flow controller of claim 9, wherein the non-transitory, tangible processor readable storage medium is encoded with processor readable instructions that include instructions for, when there is a set point change to a new set point:

reducing the time constant;

initiating a timer to track a time that has transpired since the time constant was reduced; and maintaining the time constant at a reduced level until the time that has transpired reaches a time threshold or the measured flow signal indicates a measured flow rate either exceeds the set point if the new set point is an increase in the set point or drops below the set point if the new set point is a decrease in the set point.

11. The mass flow controller of claim 10, wherein the non-transitory, tangible processor readable storage medium is encoded with processor readable instructions that include instructions for:

maintaining the time constant at the reduced level until the measured flow signal indicates the measured flow rate:

exceeds the set point and then drops below the set point if the new set point is an increase in the set point; or drops below the set point and then exceeds the set point if the new set point is a decrease in the set point.

12. The mass flow controller of claim 8, wherein the non-transitory, tangible processor readable storage medium is encoded with processor readable instructions that include instructions for, when a set point changes to a new set point:

storing a last indicated flow value in memory as a reference point, wherein the last indicated flow value is a mass flow rate value provided as the indicated flow;

performing, while a measured flow rate has not reached the new set point, a smoothing operation including:

providing the reference point as the indicated flow if the measured flow rate is less than the reference point; and setting, if the measured flow rate is not less than the reference point, the reference point to the measured flow rate and providing the reference point as the indicated flow output.

13. The mass flow controller of claim 8, including:

a communication component configured to enable the mass flow controller to communicate the indicated flow to an operator of the mass flow controller;

wherein providing the indicated flow to the operator includes providing the indicated flow to the operator via the communication component.

14. The mass flow controller of claim 8, including:

a display configured to enable the mass flow controller to communicate the indicated flow to an operator of the mass flow controller;

wherein providing the indicated flow to the operator includes providing the indicated flow to the operator via the display.

15. A mass flow controller comprising:

a sensing element circuit configured to provide a flow sensor signal in response to a fluid passing through the mass flow controller;

means for generating a measured flow signal from the flow sensor signal, the measured flow signal is indicative of a mass flow rate of a fluid that is controlled by the mass flow controller;

means for obtaining samples of the measured flow signal within a time interval and determining a rate of change of the mass flow rate of the fluid based upon the samples of the measured flow signal;

means for adjusting a time constant used in connection with filtering the measured flow signal based upon the rate of change of the mass flow rate;

means for filtering the measured flow signal using the adjusted time constant to generate an indicated flow that provides a representation of the actual mass flow rate of the fluid; and means for providing the indicated flow to an operator of the mass flow controller.

16. The mass flow controller of claim 15, including:

means for increasing the time constant until a maximum time constant is reached or until the rate of change of the mass flow rate exceeds a threshold.

17. The mass flow controller of claim 16, including, when there is a set point change to a new set point:

means for reducing the time constant;

means for initiating a timer to track a time that has transpired since the time constant was reduced; and means for maintaining the time constant at a reduced level until the time that has transpired reaches a time threshold or until the measured flow signal indicates a measured flow rate either exceeds the set point if the new set point is an increase in the set point or the measured flow rate drops below the set point if the new set point is a decrease in the set point.

18. The mass flow controller of claim 17, including:

means for maintaining the time constant at the reduced level until the measured flow signal indicates the measured flow rate:

exceeds the set point and then drops below the set point if the new set point is an increase in the set point; or drops below the set point and then exceeds the set point if the new set point is a decrease in the set point.

19. The mass flow controller of claim 18 including, when a set point changes:

means for storing a last indicated flow value in memory as a reference point, wherein the last indicated flow value is a mass flow rate value provided as the indicated flow;

means for performing, while a measured flow rate has not reached the new set point, a smoothing operation including:

means for providing the reference point as the indicated flow if the measured flow rate is less than the reference point; and means for setting, if the measured flow rate is not less than the reference point, the reference point to the measured flow rate and providing the reference point as the indicated flow.

* * * * *